Oct. 1, 1957   R. BECK ET AL   2,808,484
PRESSURE OPERATED SWITCH
Filed May 21, 1952
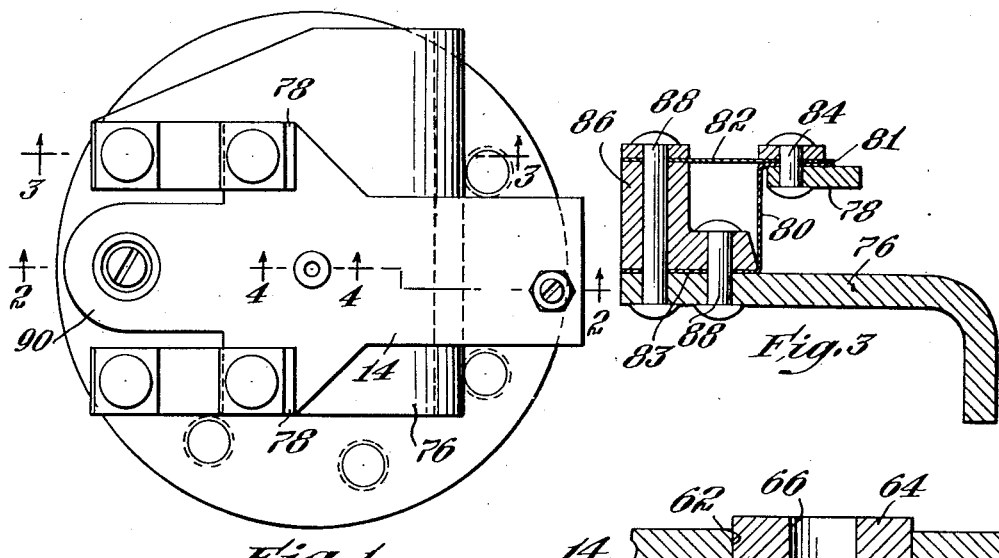
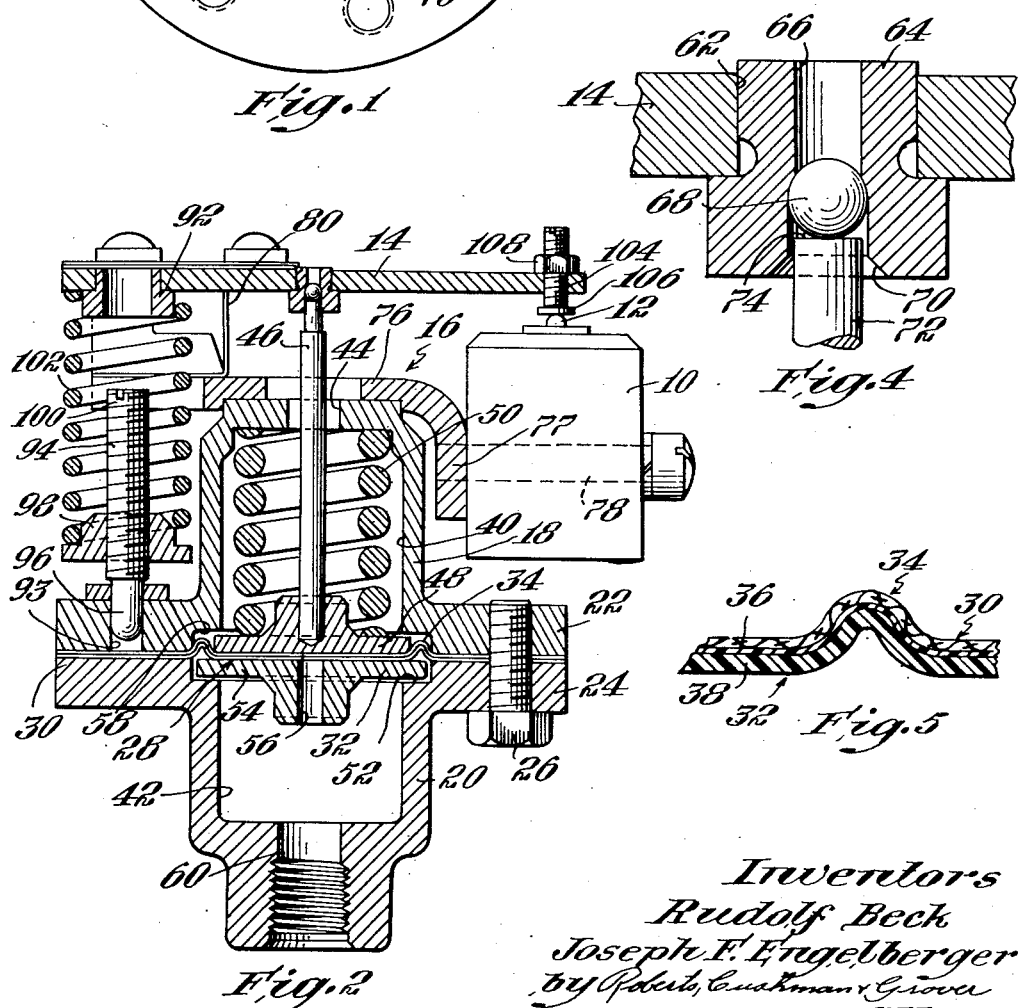
Inventors
Rudolf Beck
Joseph F. Engelberger
by Roberts, Cushman & Grover
att'ys.

United States Patent Office 2,808,484
Patented Oct. 1, 1957

2,808,484

PRESSURE OPERATED SWITCH

Rudolf Beck, Fairfield, and Joseph F. Engelberger, Bridgeport, Conn., assignors to Manning, Maxwell & Moore, Incorporated, New York, N. Y., a corporation of New Jersey Application May 21, 1952, Serial No. 289,024

6 Claims. (Cl. 200—83)

This invention relates to pressure operated switches and especially to fluid pressure switches for use in aircraft.

The principal objects of the invention are to provide a pressure operated switch for aircraft use which has to meet stringent specifications particularly of minimum size, weight and resistance to shock and vibration. Further objects are to provide a switch which will withstand pressures of over 1000 pounds per square inch and yet will operate at much lower pressures and with a small differential between on and off positions. A still further object of the invention is to employ a diaphragm operated switch which will be sensitive to pressure changes even though made of the least possible diameter so as to be in keeping with minimum size and weight by suitable design of the operating parts. Other objects are to provide a switch in which friction of the operating parts is substantially eliminated and the weight of the various parts is distributed so that they will be substantially in equilibrium thereby to make for high fidelity in response to rapid pressure changes and to reduce the effect of vibration and shock. Other objects are to provide an instrument which is inexpensive to manufacture, durable and will not be damaged by the occurrence of excessive pressures.

The switch to be operated is a conventional electric switch, for example a snap switch having an operating pin and as illustrated herein the pressure operated means for depressing the pin includes a pivotally supported lever, a portion of which overlies the operating pin and is normally held pressed against the pin by a variable load applied to the lever. A pressure responsive element has contact with the lever and is operable when the pressure exceeds a predetermined amount to act on the lever in a direction to tilt it on its pivot in opposition to the variable load to move the end of the lever having contact with the pin thereby to effect operation of the switch. The variable load is in the form of a coiled spring, the effective length of which may be varied to change its resistance to yielding and is applied to the lever at the opposite side of the pivot from the pressure responsive means. The pressure responsive means includes a spindle, one end of which bears against the lever and the other end of which rests on a diaphragm, the latter being exposed to the action of fluid pressure. A primary load in the form of a coiled spring of predetermined resistance to pressure is arranged to oppose displacement of the diaphragm until the fluid pressure exceeds a predetermined amount. To minimize friction and inertia the lever is balanced on the upper ends of flat leaf springs, and the motion of the spindle is transmitted to the lever by way of a ball fast to the lever which has contact with a flat surface at the upper end of the spindle. To insure sensitiveness to pressure changes and to afford strength, the diaphragm is comprised of a sheet of fiber glass coated with tetrafluoro ethylene for strength and a sheet of plain tetrafluoro ethylene for imperviousness, the sheets being joined face to face and having a permanent corrugation formed in the substance thereof to provide a hinge which will permit displacement of the central portion of the diaphragm with reference to its margin.

The invention will now be described in greater detail with reference to the accompanying drawings wherein:

Fig. 1 is a plan view of the pressure operated switch;

Fig. 2 is a vertical diametrical section taken on the line 2—2 of Fig. 1;

Fig. 3 is a vertical fragmentary section taken on the line 3—3 of Fig. 1, showing to larger scale details of the lever support;

Fig. 4 is a section to larger scale taken on the line 4—4 of Fig. 1; and

Fig. 5 is a section to larger scale of a fragmentary portion of the diaphragm.

Referring to the drawings the pressure operated switch comprises a conventional snap electric switch 10 having an operating pin 12, a lever 14 for controlling the position of the pin and pressure responsive means for operating the control lever. The foregoing parts are assembled in operating relation on a frame 16 consisting of a housing containing the pressure responsive means and a bracket plate fast to the top of the housing on which is mounted the switch and lever. The housing consists of two substantially cylindrical cup-shaped members 18 and 20 having radial flanges 22 and 24 about their open ends placed flange to flange and secured together by a series of bolts 26 passed through the flanges. The bracket plate has a broad flat portion 76, the underside of which is recessed to fit over the upper end of the member 18 and is made fast thereto for example by brazing or welding and a downwardly extending lip or flange 77 to which the electric switch 10 is made fast by bolts 78 with its operating pin 12 facing upwardly.

The control lever 14 is pivotally balanced on supporting members made fast to the housing with one end bearing on the operating element 12 of the electric switch. A secondary loading spring 102 acts on the opposite end of the lever and yieldably biases the lever on the supporting members into contact with the switch operating pin. A lever operating spindle 46 also bears against the lever and is operable as will appear hereinafter to raise the lever out of contact with the switch operating pin. In order to balance the masses so that the lever will be sensitive to pressure changes without being sensitive to shock and/or vibration the supporting members 80 for pivotally balancing the lever are arranged between the secondary loading spring and the operating spindle. To this end as illustrated the control lever which is in the form of a flat bar or arm has about midway between the loading spring and the operating spindle oppositely extending lateral projections or ears 78—78 by which the lever is made fast to the supporting members. The supporting members consist of two pairs of flat springs 80—80 and 82—82. The springs 80—80 (Fig. 3) are mounted so as to stand on end in cantilever fashion perpendicular to the bracket and have at their upper and lower ends oppositely extending flanges 81—81 and 83—83. The springs 82—82 are arranged horizontally so as to be parallel to the bracket with their forward ends coinciding with the flanges 81—81 and their rear ends coextensive with the flanges 83—83 but vertically spaced above them. The flanges 81—81 and the forward ends of the springs 82—82 are made fast to the ears 78—78 by rivets 84. The flanges 83—83 and the rear ends of the springs 82—82 are made fast to the rear ends of the brackets with spacer blocks 86—86 interposed therebetween by rivets 88 passing through the blocks, flanges and brackets 76. As thus mounted the lever 14 is held vertically spaced from the bracket 76 and parallel thereto so that it may be pivoted on the upper ends of the springs 80—80 to move it forward end to end from the pin 12. The springs 82—82 steady the lever 14 and prevent longitudinal or lateral displacement of the lever relative to the bracket.

The foregoing pivotal mounting of the control lever 14 minimizes the effect of its weight and inertia thus making it sensitive to small and/or rapid changes of pressure.

The forward end of the control lever (Fig. 1) has threaded through it a vertical stud 104, the lower end of which has a flat head 106 on it for engagement with the pin 12. The stud 104 may be vertically adjusted so that it will engage and disengage the pin at the desired pressure and may be locked in adjusted position by a nut 108.

The head of the stud at the forward end of the control lever is normally held in contact with the pin 12 by an adjustable force or load, referred to as the secondary load, applied to the rear end of the control lever, that is rearwardly of its pivot springs 80—80. As illustrated in Figs. 1 and 2 the rear end 90 of the lever has a bushing 92 set into its underside. Vertically below the bushing a hole 93 is drilled in the flange 22 of the upper member 18. A staff having a threaded body 94 and smooth cylindrical foot 96 is stepped in the hole 93 so as to stand vertically upward from the flange and to be axially aligned with the axis of the bushing and provides support for a nut 98 which has an annular flange. A stiff coiled spring 102 is placed about the staff with its upper end surrounding the bushing and its lower end surrounding the nut and resting on the flange. As thus arranged the spring 102 normally exerts an upward force on the lever 14 elevating its rear end and depressing its forward end to hold the head of the stud 104 against the pin 12. The upper end of the staff is provided with a slot 100 so that it may be turned thereby to elevate or depress the nut and hence to vary the pressure exerted by the spring.

The pressure responsive means includes among other elements a flexible diaphragm 28 (Figs. 2 and 5) having an annular marginal portion 30 clamped between the flanges 22 and 24 and a central portion 32 extending transversely of the members 18 and 20 and dividing the housing into two distinct chambers 40 and 42 hereinafter designated as the loading and pressure chambers. The useful deflection of a diaphragm and hence its sensitivity to pressure changes decreases with its decrease in diameter. Accordingly, to enhance the sensitivity of the diaphragm used herein which is of comparatively small diameter, that is to make up for the loss sustained by its small diameter a permanent annular rib or corrugation 34 is pressed into it to provide a sort of hinge which permits the unsupported central portion 32 of the diaphragm to move readily with very small changes in pressure. The working diameter of the diaphragm used herein is ⅞" however it is to be understood that it may be varied in size with variations in the dimensions of the device according to its use.

To meet the requisites of size, ambient temperature changes, corrosion and sensitivity required in a satisfactory manner, it has been found necessary to employ a laminated diaphragm comprised of layers 36 and 38 (Fig. 5). The layer 36 consists of a sheet of glass fabric coated with tetrafluoro ethylene which affords the necessary strength to withstand the high pressures encountered while the layer 38 consists of a plain sheet of tetrafluoro ethylene which affords the imperviousness necessary to make a satisfactory seal. Tetrafluoro ethylene is a synthetic resin known as Teflon and comprises a polymerized tetrafluoro ethylene (see Brady, "Materials Handbook," 6th edition, 1947, at page 259). The sheets are placed face to face with the plain Teflon sheet at the underside so as to be exposed to the direct action of the fluid pressure. Commercial fiber glass is available in sheet form and is comprised of glass fibers spun and woven on regular textile machines. Such fabrics vary in thickness from 0.002 to 0.023". A fabric of 0.005" has a tensile strength equal to about 22,000 pounds per square inch. The cloth may be made of continuous glass fiber or staple glass fiber and is much used for laminated plastic.

The diaphragm is exposed to fluid pressure at its underside which is admitted to the pressure chamber 42 through a port 60. Movement of the diaphragm is transmitted to the lever 14 by way of a spindle 46 which is made fast at its lower end to a disk 48 resting on the central part of the diaphragm. The spindle rises upwardly from the disk 48 through a hole 44 in the upper end of the loading chamber 40 through a hole in the bracket concentric with the hole 44 and bears against the underside of the lever 14 at a point between the pivot springs and the stud 104.

In order to limit excessive displacement of the diaphragm in either direction beyond the amount which is necessary to effect operation of the switch and hence to prevent damaging the diaphragm by excessive pressure, limit stops are provided. In the chamber 42 the limit stop is in the form of a disk 54 which extends transversely of the chamber and supports the central portion of the diaphragm. The disk is loose, its peripheral edge rests on an annular shoulder 52 formed in the flange 24 bounding the chamber 42. The disk 54 has a central aperture 56 to permit fluid pressure within the chamber 42 to act on the diaphragm. In the chamber 40 the disk 48 forms the limit stop by contact of its peripheral edge with an annular shoulder 58 formed in the flange 22 bordering the chamber 40. Thus regardless of the pressure exerted at either side of the diaphragm it cannot be displaced to a point of rupture.

In order to transmit the force applied to the diaphragm by way of the spindle to the lever, which may be considerable, with minimum friction and without destroying the balance and sensitivity secured through balancing the lever on the spring pivots, an anti-friction ball bearing is employed at the point of contact between the spindle and lever.

To this end the lever 14 has formed in it an aperture 62 into which there is press fitted a bushing 64. The bushing has a vertical hole 66 therein concentric with the axis of the spindle 46. A steel ball 68 is press fitted into the lower end of the hole 66 and the mouth of the hole is flared or countersunk as shown at 70. The upper end of the spindle 46 is reduced somewhat in diameter so as to be slightly smaller diameter than the ball as shown at 72 and has a flat upper surface 74 for tangential contact with the lower side of the ball 68 thus providing a substantially point contact between the arm 14 and the upper end of the spindle 46. The distance between the bottom of the countersink and a plane tangent to the ball should be about .2 to .3 times the diameter of the ball. The reduced end 72 in turn has a diameter of about .001 to .002" smaller than the hole in which the ball is seated. With the foregoing construction the desideratum referred to are attained without sacrificing the amount of force that may be transmitted through the spindle contact.

The device is designed to operate at high pressures but in order to avoid having to make the operating parts of heavy construction and hence less sensitive to pressure changes and furthermore so that pressures way below those at which the switch is normally intended to be actuated will not be constantly applied to the moving parts and hence tend to wear and destroy their sensitivity, the diaphragm is initially loaded so that it will not be displaced until the pressure within the chamber 42 exceeds a predetermined amount. To this end a primary load in the form of a heavy coiled spring 50 is placed about the spindle 46 within the chamber 40 with one end resting on the disk 40 and its opposite end bearing on the underside of the top of the chamber. The spring 56 will thus hold the diaphragm down against the disk 32 until the pressure in the chamber 42 is sufficient to overcome the spring.

When the pressure in the chamber 42 exceeds the spring pressure of the spring 50 the spindle 46 will tend to raise the diaphragm and the lever and tilt it counterclockwise on its pivot springs. Such counterclockwise movement however will be resisted by the spring 102 and hence will only take place when the pressure exceeds not only the spring 50 but the added resistance of the spring 102. It is at once evident that by suitable adjustment the resistance of the spring 102 may be set to yield at any given amount, that is ounces or pounds above the yield point of the spring 50. By way of example only the spring 50 may be set to yield at 1000 pounds per square inch and the spring 102 to yield at some pressure between 0 and 30 pounds per square inch depending upon the adjustment of the staff 94, hence the device may be set so that no force is applied to the lever 14 until a pressure of 1000 pounds per square inch is reached whereupon it will then respond to some pressure between 1000 pounds per square inch and 1030 pounds per square inch.

Having described the construction of the pressure operated switch it is clear that its operation is comparatively simple. It is only necessary to connect the lower half 20 of the housing to the system containing the pressure medium, for example by a threaded coupling adapted to be screwed into the threaded boss at the bottom of the part 20. Having made the connection and chosen springs of suitable calibration when the fluid pressure communicated to the chamber 42 exceeds the resistance of the spring 50 to yield, the spindle 46 will tend to rise and to move the lever 14 counterclockwise with respect to its pivot springs 80—80. This will be resisted by the spring 102 which tends to hold the stud 104 at the end of the lever engaged with the pin 12. When the fluid pressure exceeds the amount of the spring 50 by the added resistance of the spring 102 the lever 14 will actually be tilted upwardly raising the stud 104 with respect to the pin 12 and thus actuating the switch. Pressure below that necessary to overcome the spring 50 will have no affect on the moving parts hence high pressures and sudden changes in pressure which might very likely damage the moving parts will be absorbed by the spring 50.

It should be understood that the present disclosure is for the purpose of illustration only and that this invention includes all modifications and equivalents which fall within the scope of the appended claims.

We claim:

1. In a pressure controlled switch, a frame, a switch on the frame, a lever, means pivotally supporting the lever on the frame for contact with said switch, means yieldably holding the lever in contact with the switch, a spindle movable to separate the lever from the switch element and a bearing for transmitting motion of the spindle to the lever, said bearing being constituted by a ball fast to the lever, a flat surface at the upper end of the spindle for contact with the ball and a guide for holding the ball in surface registration with the end of the spindle without inhibiting free rocking movement of the ball on the surface.

2. In a pressure operated switch, a switch and operating element therefor, a lever having contact with said switch, yieldable means holding the lever in contact with the switch, a bushing fast to the lever, said bushing having a hole therein, a ball pressed into the hole in the bushing, the mouth of the hole in the bushing being countersunk, and a spindle movable to separate the lever from said switch element, said spindle having a cylindrical end smaller in diameter than said hole in the bushing, adapted to fit into the hole and having a flat end surface for contact with the ball.

3. A pressure operated switch according to claim 2 wherein the spindle has a cylindrical end .001" to .002" smaller in diameter than the hole in which the ball is seated.

4. A pressure operated switch according to claim 2 wherein the ball is pressed into the hole in the bushing to a depth of .2 to .3 times the diameter thereof.

5. In a pressure operated switch, a frame, a switch fast to the frame, said switch having an operating element, a pair of leaf springs fast at their lower ends to the frame, said springs having freely flexible portions rising therefrom, a lever fast to the upper ends of said flexible portion of said springs, said springs providing cantilever supports for the lever, yieldable means acting on the lever at one side of the springs yieldably holding the lever engaged with said operating element and fluid pressure responsive means constructed and arranged to act on the lever at the opposite side of said supporting means to effect movement of the lever in a direction to separate it from said operating element.

6. In a pressure operated switch, a frame, a switch fast to the frame, said switch having an operating element, a lever for effecting operation of the switch and pivot means for the lever, said pivot means comprising a pair of flat springs made fast at their lower ends to the frame, said springs standing erect and being fixed at their upper ends to the lever at opposite sides thereof and intermediate its ends so that the lever is balanced thereon and a second pair of flat springs fast at their forward ends with the upper ends of the first pair of springs to the lever and at their rear ends to the frame at the level of their forward ends.

References Cited in the file of this patent

UNITED STATES PATENTS

| | | |
|---|---|---|
| 552,803 | Williams | Jan. 7, 1896 |
| 1,712,657 | Frankenberg | May 14, 1929 |
| 1,821,950 | Stout et al. | Sept. 8, 1931 |
| 1,843,256 | Van Valkenburg | Feb. 2, 1932 |
| 2,170,341 | Shaw | Aug. 22, 1939 |
| 2,289,549 | Norstrom | July 14, 1942 |
| 2,404,843 | Huber | July 30, 1946 |
| 2,428,096 | Reavis | Sept. 30, 1947 |
| 2,442,456 | Boyden et al. | June 1, 1948 |
| 2,485,074 | Stevenson | Oct. 18, 1949 |
| 2,499,040 | Steinback | Feb. 28, 1950 |
| 2,620,413 | Johnson | Dec. 2, 1952 |